United States Patent
Kim et al.

(10) Patent No.: US 8,824,385 B2
(45) Date of Patent: Sep. 2, 2014

(54) LOCAL MOBILITY ANCHOR, PROXY ROUTER, AND MANAGEMENT METHOD FOR SUPPORTING NETWORK MOBILITY IN PROXY MOBILE IPV6 NETWORK

(75) Inventors: Young-Han Kim, Seoul (KR); Se-Il Jeon, Seoul (KR)

(73) Assignee: Foundation of Soongsil University-Industry Cooperation, Seoul (KR)

( * ) Notice: Subject to any disclaimer, the term of this patent is extended or adjusted under 35 U.S.C. 154(b) by 763 days.

(21) Appl. No.: 13/016,092

(22) Filed: Jan. 28, 2011

(65) Prior Publication Data

US 2012/0099539 A1    Apr. 26, 2012

(30) Foreign Application Priority Data

Oct. 20, 2010  (KR) .......................... 10-2010-0102498

(51) Int. Cl.
| | | |
|---|---|---|
| *H04W 4/00* | (2009.01) | |
| *H04L 12/28* | (2006.01) | |
| *H04W 8/26* | (2009.01) | |
| *H04W 36/00* | (2009.01) | |
| *H04W 84/00* | (2009.01) | |
| *H04W 80/04* | (2009.01) | |

(52) U.S. Cl.
CPC ............ *H04W 8/26* (2013.01); *H04W 36/0022* (2013.01); *H04W 84/005* (2013.01); *H04W 80/04* (2013.01)
USPC .......................................... 370/329; 370/392

(58) Field of Classification Search
USPC .......................................................... 370/329
See application file for complete search history.

(56) References Cited

U.S. PATENT DOCUMENTS

| | | | |
|---|---|---|---|
| 2003/0035387 A1* | 2/2003 | Kim .............................. | 370/328 |
| 2009/0185538 A1* | 7/2009 | Choi et al. .................... | 370/331 |
| 2010/0268804 A1* | 10/2010 | Aso et al. ...................... | 709/222 |

* cited by examiner

*Primary Examiner* — Gerald Smarth
(74) *Attorney, Agent, or Firm* — William Park & Associates Ltd.

(57) ABSTRACT

Provided are an LMA, a proxy router, and a management method for supporting NEMO in a PMIPv6 network. To support mobility in the PMIPv6 network for mobile nodes forming one node group within a mobile network, the proxy router for delivering signal and data between the mobile nodes and the PMIPv6 network delivers mobile home network prefixes allocated by the LMA of the PMIPv6 network to the mobile nodes. The LMA generates a group ID corresponding to the node group. Packet delivery costs due to an unnecessary tunnel may be reduced by grouping a plurality of mobile nodes constituting a mobile network, and using and managing flags and the same group ID.

16 Claims, 10 Drawing Sheets

FIG. 8

| Type | Code | Checksum |
|---|---|---|
| P D | Reserved | |
| Mobility Node Identifier Option | | |

FIG. 9

| Type | Code | Checksum |
|---|---|---|
| Cur Hop Limit | M O P Reserved | Router Lifetime |
| Reachable Time | | |
| Reachable Time | | |
| Mobility Node Identifier Option | | |

LOCAL MOBILITY ANCHOR, PROXY ROUTER, AND MANAGEMENT METHOD FOR SUPPORTING NETWORK MOBILITY IN PROXY MOBILE IPV6 NETWORK

CLAIM FOR PRIORITY

This application claims priority to Korean Patent Application No. 2010-0102498 filed on Oct. 20, 2010 in the Korean Intellectual Property Office (KIPO), the entire contents of which are hereby incorporated by reference.

BACKGROUND

1. Technical Field

Example embodiments of the present invention relate in general to a local mobility anchor (LMA), a proxy router, and a management method for supporting network mobility (NEMO) in a proxy mobile IPv6 (PMIPv6) network, and more specifically, to devices and methods for supporting NEMO with only a PMIPv6 protocol for a mobile node in which a mobile IP function is not implemented.

2. Related Art

NEMO management techniques are next-generation mobility management technologies for effectively managing mobility of a number of mobile nodes having the same mobility pattern, and overcoming limitations in wireless coverage of a mobile node such as a Wi-Fi device by interworking with WiMAX or HSPDA access technology in an external interface, and Wi-Fi access technology in an internal interface. In an existing NEMO management method, a mobile IPv6 function is mounted in a mobile router (MR) and locations of mobile terminals located in a mobile network are managed. Here, mobile IPv6 is a node-based mobility support protocol.

However, the mobile IPv6 has a problem of handover performance due to an operation in which a host senses movement of a terminal, updates a location of the terminal, and re-generates an IP address according to a handover. Thus, PMIPv6, which is a network-based mobility management technique for providing a function of sensing the mobility of a node and updating the location of the node in a network, has been proposed.

In PMIPv6, a network performs mobility sensing requested for a mobile node. Resetting of an IP address is unnecessary within the same PMIPv6 domain. Thus, high-speed mobility management is achieved only by mounting an IPv6 protocol inside the mobile node. To provide an NEMO function based on merits of the PMIPv6 protocol, a procedural method supportable with a PMIPv6 network without a mobile IP protocol in an existing MR, and an effective handover method according to movement of a mobile network, are required.

FIG. 1 is a flow diagram showing a mobility management procedure according to a relay-based NEMO (rNEMO) management technique proposed in the related art.

Referring to FIG. 1, in the rNEMO management technique, NEMO can be supported without correcting a basic procedure provided in PMIPv6, by causing a relay node to be responsible for only relaying a signal and data through signal amplification between a mobile node and a mobile access gateway (MAG), instead of an existing MR. A process of adding and removing a tunnel header is removed in terms of packet delivery, so that unnecessary detour traffic is reduced.

However, when a mobile network including many mobile nodes moves to another MAG, all mobile nodes included in the mobile network should be connected to a new MAG. In this case, there is a disadvantage in that signaling for an existing mobility management/control procedure of individual mobile nodes should be generated, and location update is not cost-effective in consideration of a number of terminals within the mobile network.

Next, FIG. 2 is a flow diagram showing a mobility management procedure in NEMO-enabled PMIPv6 (N-PMIPv6), which is another NEMO management technique proposed in the related art.

Referring to FIG. 2, a moving MAG (mMAG) responsible for a MAG function in an existing MR is provided in N-PMIPv6. An LMA provides a location management function using the mMAG for mobile nodes within a mobile network. There is an advantage in that only addition of management information items for the existing MAG and LMA through the management of mobile network terminals using the mMAG is required, and locations of existing mobile nodes located within the mobile network are simultaneously updated only through an mMAG-based handover procedure during a network handover.

However, since the existing MAG does not know information of mobile network terminals, a tunnel header in which a destination IP address is delivered to the mMAG is delivered separately from a PMIPv6 tunnel header to be delivered from the LMA to the MAG in the case of a packet addressed to the mobile network. Thereafter, the MAG re-delivers the packet to the mMAG after removing one tunnel header, so that packet delivery overhead occurs in wired/wireless communication. In view of limited wireless network resources, excessive wired/wireless resources may be wasted in the existing N-PMIPv6 according to a number of mobile network terminals and a data transmission rate.

Accordingly, a new NEMO management technique is necessary which improves efficiency in terms of handover signaling as compared to rNEMO, and is cost-effective in terms of packet delivery as compared to that of N-PMIPv6.

SUMMARY

Accordingly, example embodiments of the present invention are provided to substantially obviate one or more problems due to limitations and disadvantages of the related art.

Example embodiments of the present invention provide an LMA, a proxy router, and a management method for supporting NEMO in a PMIPv6 network that may be cost-effective in location update when a mobile network constituted by a number of mobile nodes moves, and may reduce packet delivery cost due to an unnecessary tunnel.

Example embodiments of the present invention also provide a computer-readable recording medium recording a program for causing a computer to execute a management method for supporting NEMO that may perform efficient location update of a mobile network in place of mobile nodes during a handover of the mobile network, and may reduce packet delivery costs according to data transmission/reception.

In some example embodiments, an LMA includes allocating mobile home network prefixes for address creation in a PMIPv6 network to mobile nodes forming one node group within a mobile network, and allocating a group ID to a proxy router, which delivers signal between the node group and the PMIPv6 network.

In other example embodiments, a proxy router includes delivering information regarding attachment of each of mobile nodes forming one node group within a mobile network and leaving from the node group, to a PMIPv6 network, delivering mobile home network prefixes allocated by an LMA of the PMIPv6 network to the mobile nodes, and delivering signal and data between the mobile nodes and the PMIPv6 network.

In still other example embodiments, a management method for supporting NEMO by an LMA of a PMIPv6 network includes (a) allocating a group ID to a proxy router, which delivers signal between a node group including a plurality of mobile nodes within a mobile network and the PMIPv6 network, and (b) allocating mobile home network prefixes for address creation in the PMIPv6 network to the mobile nodes.

In still other example embodiments, a management method for supporting NEMO by a proxy router, which delivers signal and data between mobile nodes forming one node group within a mobile network and a PMIPv6 network, includes delivering information regarding attachment of each of the mobile nodes and leaving from the node group, to the PMIPv6 network, and delivering mobile home network prefixes allocated by an LMA of the PMIPv6 network to the mobile nodes.

BRIEF DESCRIPTION OF DRAWINGS

Example embodiments of the present invention will become more apparent by describing in detail example embodiments of the present invention with reference to the accompanying drawings, in which:

FIG. 8 is a diagram showing a configuration of a router solicitation message including 'P' and 'D' flags;

FIG. 9 is a diagram showing a router advertisement message including a 'P' flag;

DESCRIPTION OF EXAMPLE EMBODIMENTS

Example embodiments of the present invention of an LMA, a proxy router, and a management method for supporting NEMO in a PMIPv6 network will now be described with reference to the accompanying drawings.

Figure 1:
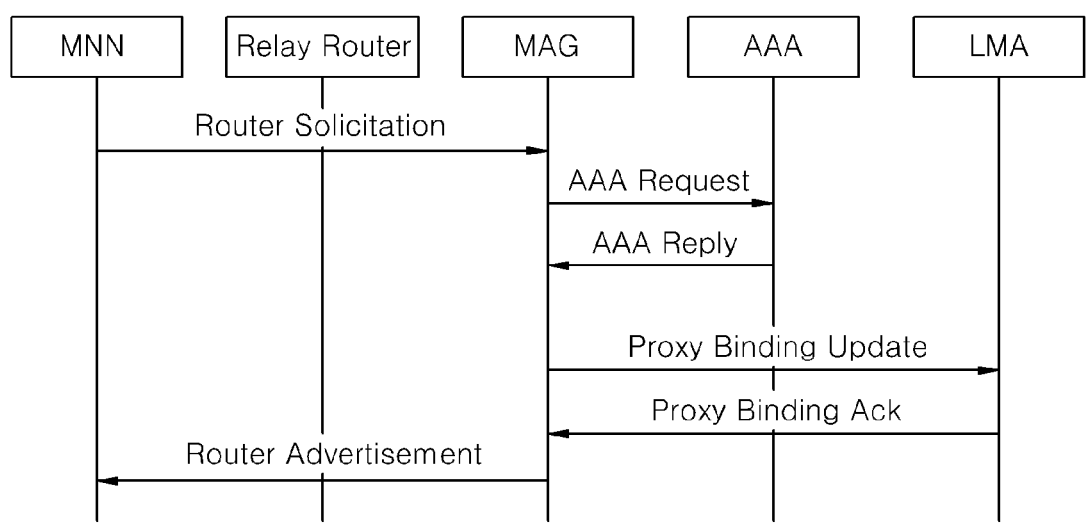
FIG. 1 is a flow diagram showing a mobility management procedure according to an rNEMO management technique proposed in the related art.
Figure 2:
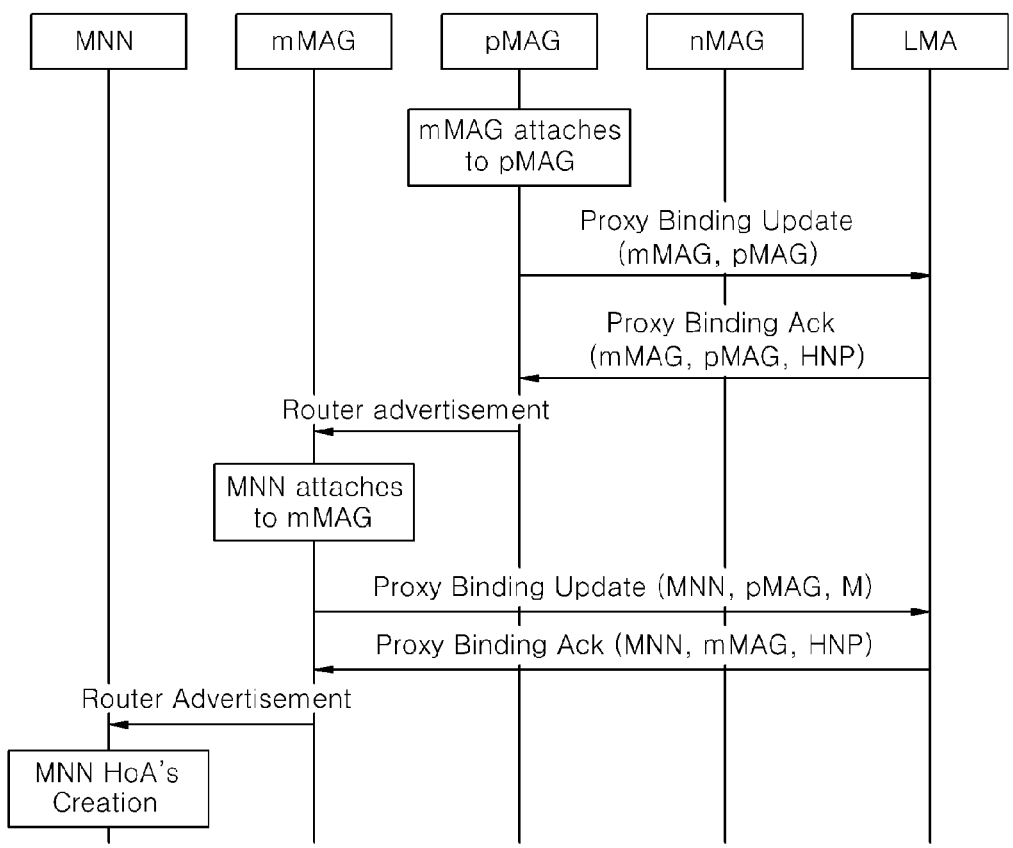
FIG. 2 is a flow diagram showing a mobility management procedure of an N-PMIPv6 structure, which is another NEMO management technique proposed in the related art.
Figure 3:
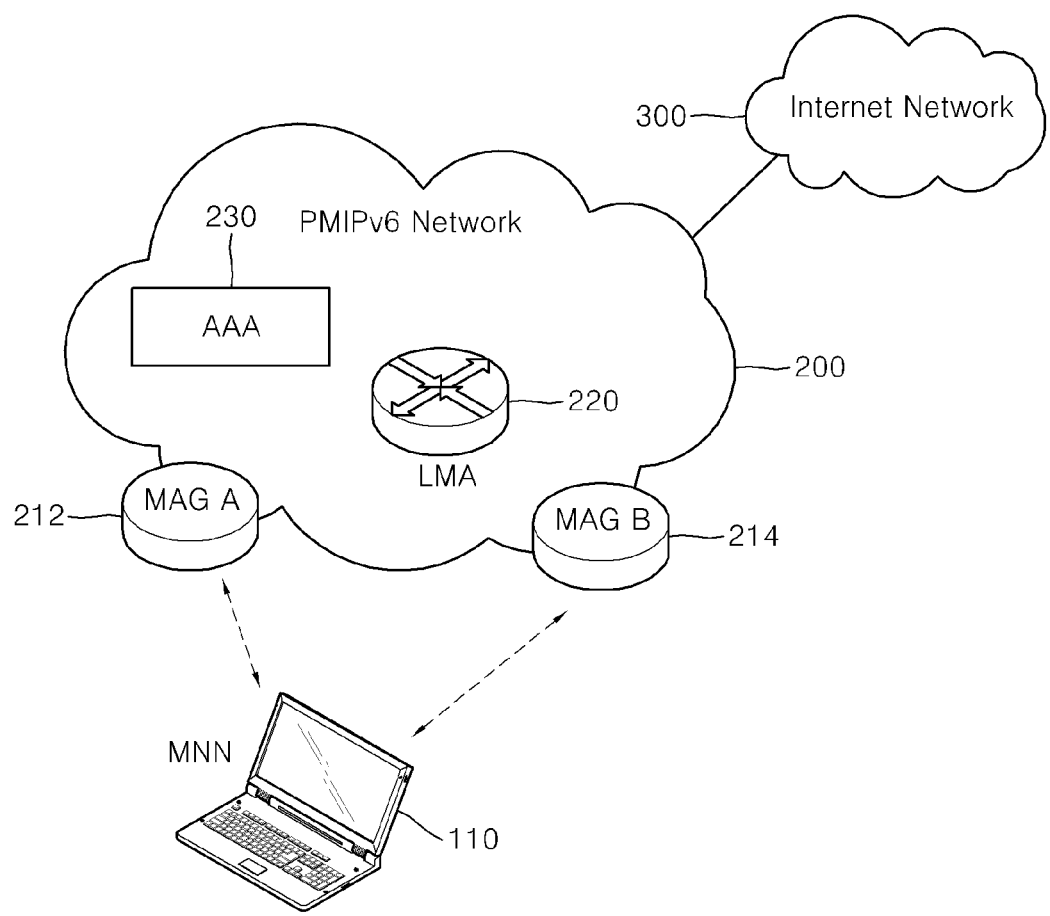
FIG. 3 is a diagram showing a configuration of a PMIPv6 network of the related art connected to a mobile node and an Internet network.

FIG. 3 is a diagram showing a configuration of a PMIPv6 network of the related art connected to a mobile node and an Internet network.

Referring to FIG. 3, a PMIPv6 network 200 connected to a mobile node (MNN) 110 and an Internet network 300 transmits data between the mobile node 110 and the Internet network 300. The PMIPv6 network 200 includes MAGs 212 and 214 that are types of gateways to which the mobile node 110 sends a connection request, an LMA 220 that is a type of anchor for managing the mobility of the mobile node 110, and an authentication server (AAA) 230 that performs authentication for the mobile node 110.

The mobile node 110 is a portable device such as a mobile communication terminal, a PDA, or a notebook computer including a wireless transceiver, an antenna, and a control device, and is capable of being wirelessly connected to the MAGs 212 and 214 through the wireless transceiver. The mobile node 110 receives a network access service by establishing a connection to the MAG 212 or 214 within the PMIPv6 network 200. The mobile node 110 sets its own IP address by receiving a router advertisement message from the MAG 212 or 214 connected to the mobile node 110.

As a device that supports the mobility of the mobile node 110, the MAG 212 or 214 detects movement of the mobile node 110 and transmits a proxy binding message to the LMA 220. The LMA 220 processes the proxy binding message, and transmits the proxy binding message including network prefix information of the mobile node 110 to the MAG 212 or 214 if network registration of the mobile node 110 is successful. Thus, the MAG 212 or 214 includes a network prefix received from the LMA 220 in a router advertisement message, and transmits the router advertisement message to the mobile node 110.

The proxy binding message is a message regarding binding information. The binding information includes information regarding the MAG 212 or 214 through which the mobile node 110 forms a connection path with the LMA 220, and the like. Binding messages are a PBU message, a PBA message, and the like.

The LMA 220 operates as a home agent for the mobile node 110 inside the network. The home agent associates and stores a care-of address (CoA), which temporarily represents a location of a mobile node in mobile IP technology, and a home address (HoA). The LMA 220 performs a function of updating the binding information on the basis of the proxy binding message received from the MAG 212 or 214 and setting up, maintaining, and releasing a connection path with the mobile node 110 on the basis of the binding information.

The authentication server 230 performs authentication for the mobile node 110. At this time, various authentication protocols including a remote access dial-in user service (RADIUS) protocol, a diameter protocol, and the like may be used as protocols for the authentication. An access acceptance message including address information of the LMA 220 is generated for the mobile node 110 whose authentication is completed, and the mobile node 110 may access a corresponding domain.

Recently, mobility of a mobile network that is a group of many mobile nodes, which are simultaneously moved by one public transportation means, has been actively studied, along with support of PMIPv6-based mobility for individual mobile nodes 110, as described above. The present invention provides more efficient mobility support for the mobile network. The LMA 220 has an additional function as well as functions defined in a standard related to an existing PMIPv6 network. The proxy router 120 is implemented by a separate device that processes a handover, and is capable of seamlessly executing a high-speed handover for the mobile network.

Figure 4:
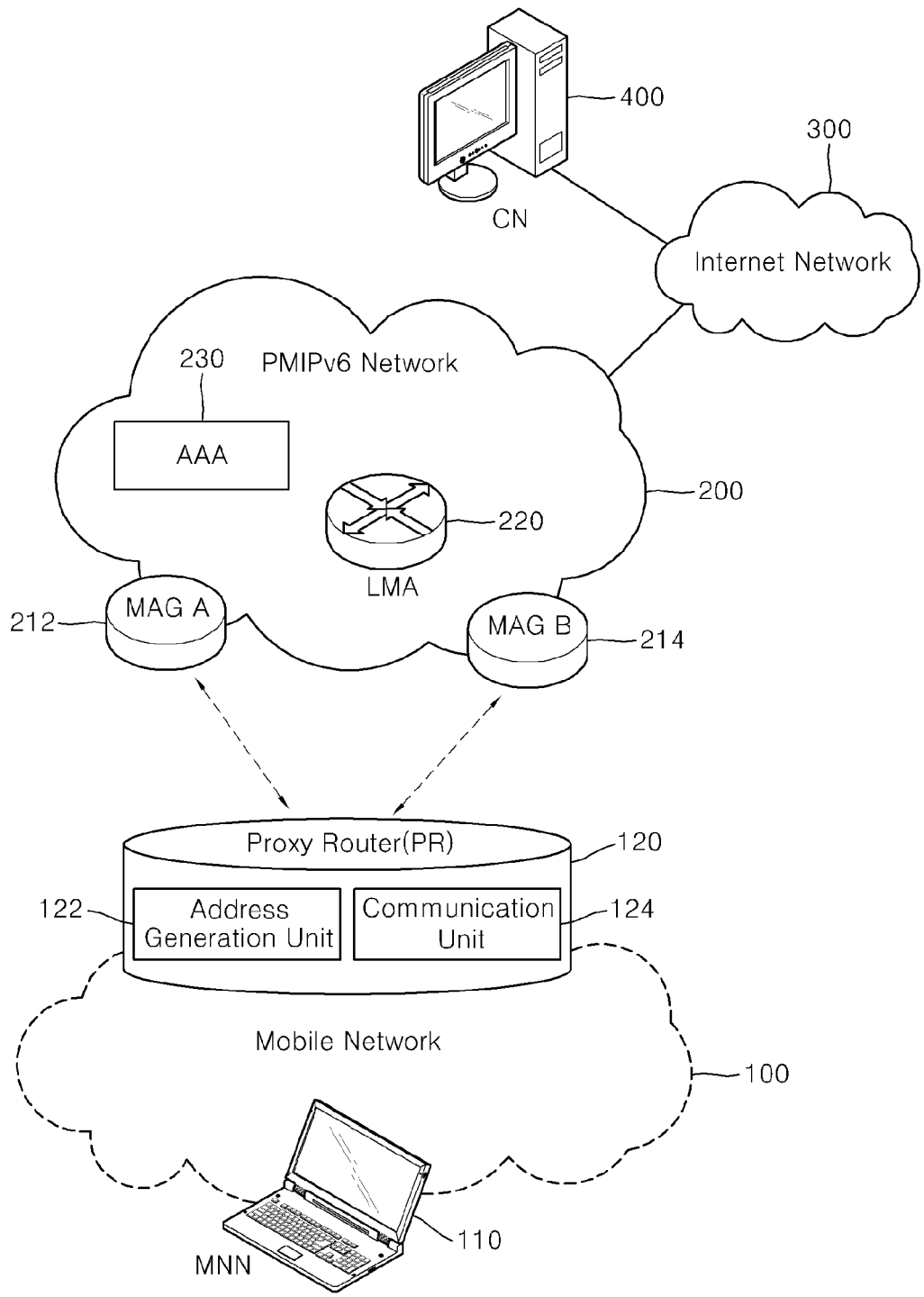
FIG. 4 is a diagram showing a network configuration including an LMA and a proxy router for supporting NEMO in a PMIPv6 network according to example embodiments of the present invention.

FIG. 4 is a diagram showing a network configuration including an LMA 220 and a proxy router (PR) 120 for supporting NEMO in a PMIPv6 network according to example embodiments of the present invention.

Referring to FIG. 4, a PMIPv6 network 200 connects a mobile network 100 and an Internet network 300. As described above, the mobile network 100 is a network formed by one or more mobile nodes 110 that form a given group, that is, one node group, and move in the same direction.

According to example embodiments of the present invention, the proxy router 120 for supporting the NEMO is connected to a plurality of mobile nodes 110 forming one node group in the mobile network 100, and is provided to support the mobility for the PMIPv6 network 200. MAGs 212 and 214 and the LMA 220 additionally have characteristic functions for the node group as well as the functions defined in the existing standard.

Hereinafter, a method in which the proxy router 120 and the mobile node 110 perform an initial registration process in the MAG-A 212 will first be described, and subsequently a handover process from the MAG-A 212 to the MAG-B 214, and a handover process in which the mobile node 110 moves from the mobile network 100 to an external PMIPv6 network, will sequentially be described.

Figure 5:
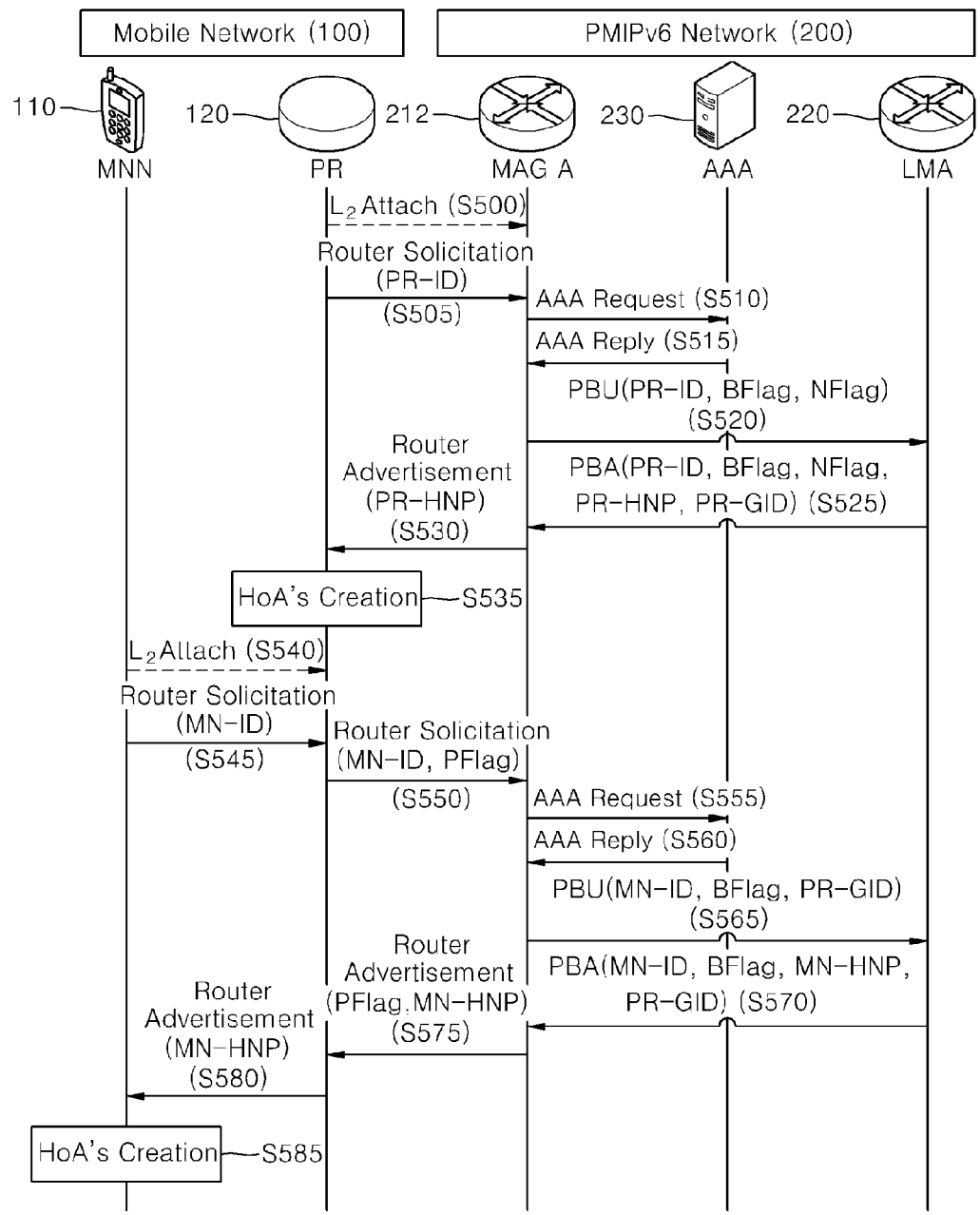
FIG. 5 is a flow diagram showing a process in which the proxy router and a mobile node are sequentially attached to MAG A of the PMIPv6 network according to example embodiments of the present invention.

FIG. 5 is a flow diagram showing a process in which the proxy router 120 and the mobile node 110 are sequentially connected to the MAG-A 212 of the PMIPv6 network 200.

Referring to FIG. 5, the proxy router 120 according to example embodiments of the present invention is first assigned a home network prefix for creating an address for attach the proxy router 120 to the PMIPv6 network 200, and simultaneously, is assigned a group ID so that mobile nodes 110 belonging to the mobile network 100 to be managed by the proxy router 120 may be managed as one node group for the PMIPv6 network 200.

Specifically, after the proxy router 120 is attached to the MAG-A 212 (S500), the proxy router 120 transmits a router solicitation message (S505). The router solicitation message includes a unique ID (PR-ID) of the proxy router 120 to be used when the MAG-A 212 and the LMA 220 of the PMIPv6 network 200 manage information of the mobile network 100. After receiving the router solicitation message, the MAG-A 212 requests the authentication server 230 to authenticate the proxy router 120 (S510). At this time, it is assumed that the proxy router 120 is registered in advance in the authentication server 230.

The MAG-A 212 checks that a node currently attached to the MAG-A 212 is the proxy router 120, not the mobile node 110, through an authentication response message received from the authentication server 230 (S515), and requests the LMA 220 to allocate the home network prefix for the proxy router 120 by transmitting a PBU message to the LMA 220 (S520). Here, the PBU message transmitted from the MAG-A 212 to the LMA 220 for connection information allocation of the proxy router 120 includes a flag related to grouping of the mobile nodes 110 to be managed by the proxy router 120 as well as the PR-ID of the proxy router 120.

In FIG. 5, a 'B' flag is a mark indicating that the mobile nodes 110 are managed as one group, and an 'N' flag is a mark indicating a message related to the proxy router 120, not the mobile node 110. The 'B' and 'N' flags and the like are defined for convenience of description, and any predefined indication method may be used.

When transmitting the PBU message for home network prefix allocation and group ID allocation for the proxy router 120 to the LMA 220, status values of the 'B' and 'N' flags as described above are set to a value indicating the group ID allocation and transmitted. For example, the values of the 'B' and 'N' flags may be set to '1'. Accordingly, the LMA 220 checks the values of the 'B' and 'N' flags and allocates a home network prefix (PR-HNP) and a group ID (PR-GID) for the proxy router 120. As such, a configuration in which an additional flag is included in a message transmitted between the MAG-A 212 and the LMA 220 corresponds to a technical feature added to the existing standard.

The LMA 220 manages the proxy router 120 and the mobile nodes 110 belonging to the node group as one group, and allocates the group ID (PR-GID) to the proxy router 120 therefor. The group ID (PR-GID) allocated to the proxy router 120 is equally applied to the mobile nodes 110 of the node group to be managed by the proxy router 120.

The LMA 220 transmits a PBA message including the home network prefix (PR-HNP) and the group ID (PR-GID) allocated to the proxy router 120 to the MAG-A 212 (S525). At this time, like the PBU message transmitted from the MAG-A 212 to the LMA 220, the PBA message includes the unique ID (PR-ID) of the proxy router 120. The status values of the 'B' and 'N' flags are set to '1' and transmitted.

Figure 6:
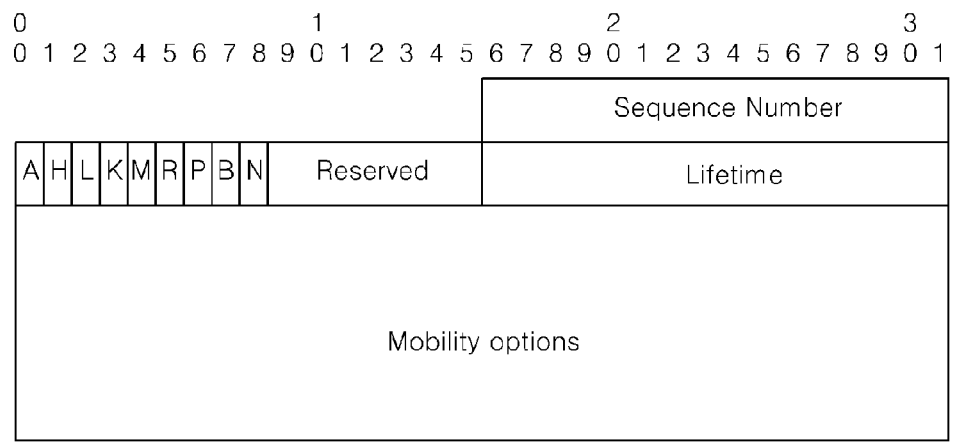
FIG. 6 is a diagram showing a configuration of a proxy binding update (PBU) message including 'B' and 'N' flags.
Figure 7:
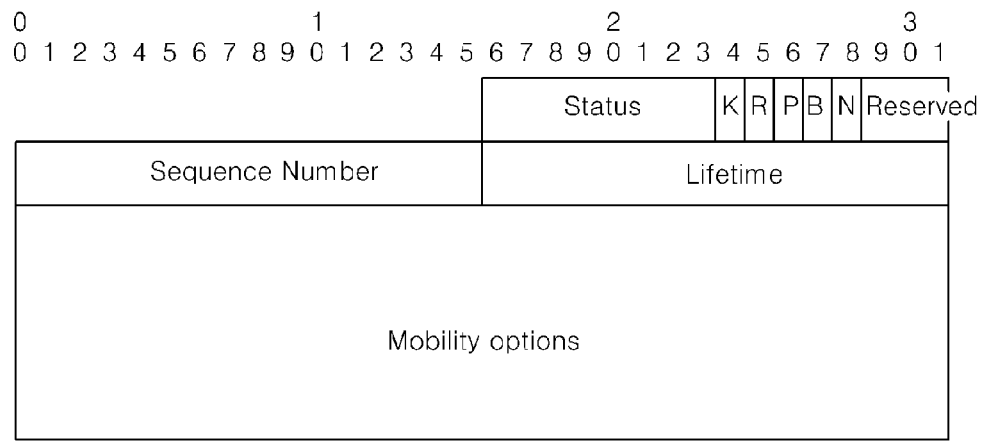
FIG. 7 is a diagram showing a proxy binding acknowledgement (PBA) message including 'B' and 'N' flags.

FIG. 6 is a diagram showing a configuration of a PBU message including 'B' and 'N' flags, and FIG. 7 is a diagram showing a configuration of a PBA message including 'B' and 'N' flags. The messages shown in FIGS. 6 and 7 may be configured in the formats as defined in the RFC 5231 standard. In FIGS. 6 and 7, the 'B' and 'N' flags are arranged between a 'P' flag and a 'Reserved' field. As described above, the flags are not limited to specific marks such as 'B' and 'N'.

After receiving the PBA message in which the status values of the 'B' and 'N' flags are set to '1' from the LMA 220, the MAG-A 212 includes the home network prefix (PR-HNP) of the proxy router 120 in a router advertisement message and transmits the router advertisement message to the proxy router 120 (S530). An address generation unit 122 of the proxy router 120 creates an address for the PMIPv6 network 200 by using the home network prefix (PR-HNP) included in the received router advertisement message (S535).

After an initial attachment to the PMIPv6 network 200 of the proxy router 120 according to example embodiments of the present invention is completed, an initial attachment process of the mobile node 110 to be managed by the proxy router 120 is performed. That is, after the mobile node 110 is attached to the proxy router 120 (S540), the mobile node 110 transmits a router solicitation message for requesting connection information for its own connection to the PMIPv6 network 200 (S545). According to example embodiments of the present invention, a communication unit 124 of the proxy router 120 delivers the transmitted router solicitation message to the MAG-A 212 (S550). At this time, the router solicitation message includes a unique ID (MN-ID) of the mobile node. The MAG-A 212 transmits an authentication request message for the mobile node 110 to the authentication server 230 (S555) and checks whether network mobility for the mobile node 110 currently connected is supportable by receiving an authentication response message from the authentication server 230 (S560).

To distinguish a router solicitation message for the initial attachment of the mobile node 110 from a router solicitation message for the initial attachment of the proxy router 120, the router solicitation message includes a separate flag like the message delivered between the MAG-A 212 and the LMA 220. That is, according to example embodiments of the present invention, the router solicitation message transmitted from the proxy router 120 to the MAG-A 212 includes the 'P' flag indicating a message related to the mobile node 110. The communication unit 124 sets the status value of the 'P' flag to a value indicating mobile home network prefix allocation for the mobile node, that is, '1', when delivering the router solicitation message including the unique ID (MN-ID) of the mobile node 110 to the MAG-A 212.

The 'P' flag is only indicated by a defined method for convenience of description as described along with the 'B' and 'N' flags, and any predefined indication method may be used. FIG. 8 is a diagram showing a configuration of the router solicitation message including the 'P' flag. The router solicitation message may be configured in the format defined in the RFC 4861 standard. It can be seen that the 'P' flag is added before the 'Reserved' field. On the other hand, as shown in FIG. 8, the router solicitation message may further include a 'D' flag along with the 'P' flag. The 'D' flag indicates movement of the mobile node 110. A status value of the 'D' flag may be set to a value indicating a attachment of the mobile node 110 or leaving from the node group. An example using the 'D' flag will be described below in detail.

After the mobile node 110 is authenticated by the authentication server 230, the MAG-A 212 checks that an ID included in the currently received router solicitation message is the unique ID (MN-ID) of the mobile node 110 through the status value of the 'P' flag, and requests the LMA 220 to allocate a mobile home network prefix for a connection of the mobile node 110 to the PMIPv6 network 200 by transmitting a PBU message to the LMA 220 (S565). In this case, a configuration of the transmitted PBU message is the same as shown in FIG. 6.

In this regard, the PBU message for allocating the mobile home network prefix includes the unique ID (MN-ID) of the mobile node 110, instead of the unique ID (PR-ID) of the proxy router 120, and also includes a group ID (PR-GID) allocated to the proxy router 120 for indicating management by the proxy router 120 in the same group. In the 'B' and 'N' flags described above, the status value of the 'N' flag indicating a message related to the proxy router 120 is set to '0', which indicates that it is related to the mobile node, and only the status value of the 'B' flag indicating that the proxy router 120 and the mobile node 110 are managed as one group is set to '1'.

Upon receipt of the PBU message in which the status value of the 'B' flag is set to '1' and the unique ID (MN-ID) of the mobile node 110 and the unique ID (PR-ID) or the group ID (PR-GID) of the proxy router 120 are included from the MAG-A 212, the LMA 220 may check that the mobile node 110 belongs to the same group as the proxy router 120. Thus, the LMA 220 manages the group ID (PR-GID) by allocating the same group ID (PR-GID) as the group ID (PR-GID) of the proxy router 120 to the mobile node 110, and adds the mobile home network prefix (MN-HNP) for the mobile node 110 in a PBA message to transmit the PBA message to the MAG-A 212 (S570). Here, in the PBA message transmitted from the LMA 220 to the MAG-A 212, the unique ID (MN-ID) and the group ID (PR-GID) of the mobile node 110 as well as the mobile home network prefix (MN-HNP) allocated to the mobile node 110 is included and the status value of the 'B' flag is set to '1'.

Upon receipt of the PBA message from the LMA 220, the MAG-A 212 delivers the router advertisement message including the mobile home network prefix (MN-HNP) to the proxy router 120 (S575). At this time, the router advertisement message includes the 'P' flag described above, and the MAG-A 212 sets the status value of the 'P' flag to '1' and delivers the status value of the 'P' flag to the proxy router 120. The proxy router 120 checks that the proxy router 120 should deliver the message to the mobile node 110 through the status value of the 'P' flag. Thus, the communication unit 124 of the proxy router 120 delivers the router advertisement message including the mobile home network prefix (MN-HNP) to the mobile node 110 in a unicast mode (S580). The mobile node 110 may create an address for its own connection to the PMIPv6 network 200 by using the mobile home network prefix (MN-HNP) included in the received router advertisement message (S585).

FIG. 9 is a diagram showing a configuration of the router advertisement message including the 'P' flag. The other configuration excluding the 'P' flag between an 'O' flag and a 'Reserved' field may be the same as that of the existing standard.

The following Table 1 shows a PBU list to be managed by the MAGs 212 and 214.

TABLE 1

| ID | HNP | Lifetime | LMA | Proxy | GID | MN LL-ID |
| --- | --- | --- | --- | --- | --- | --- |
| PR_1 | Pref-PR::/64 | 3500 s | LMA A | Yes | PR-GID_1 | PR_1:1:1:1:1:1 |
| MN_1 | Pref-MN1::/64 | 3000 s | LMA A | No | PR-GID_1 | MN_1:1:1:1:1:1 |
| MN_2 | Pref-MN2::/64 | 1000 s | LMA B | No | X | MN_2:1:1:1:1:1 |

The PBU list of Table 1 has a form in which information (proxy) for identifying whether a connection node is a general mobile node 110 or the proxy router 120, and information regarding a group ID (GID), are added to an existing proxy binding list managed by the MAGs 212 and 214.

Referring to Table 1, information (an ID MN_1) regarding a mobile node that transmits/receives information through the proxy router 120 belonging to the node group as well as information (an ID PR_1) regarding a proxy router directly attached to the MAGs 212 and 214 and information (an ID MN_2) regarding a mobile node not belonging to the node group is stored in the PBU list.

The following Table 2 shows a binding cache entry to be managed by the LMA 220.

TABLE 2

| ID | HNP | Lifetime | Proxy | GID | MAG |
| --- | --- | --- | --- | --- | --- |
| PR_1 | Pref-PR::/64 | 3500 s | Yes | PR-GID_1 | MAG A |
| MN_1 | Pref-MN1::/64 | 3000 s | No | PR-GID_1 | MAG A |
| MN_2 | Pref-MN2::/64 | 1000 s | No | X | MAG A |

The binding cache entry of Table 2 has a form in which information (proxy) for identifying whether a connection node is a general mobile node 110 or the proxy router 120, and information regarding a group ID (GID), are added to an existing binding cache entry managed by the LMA 220 in general.

Figure 10:
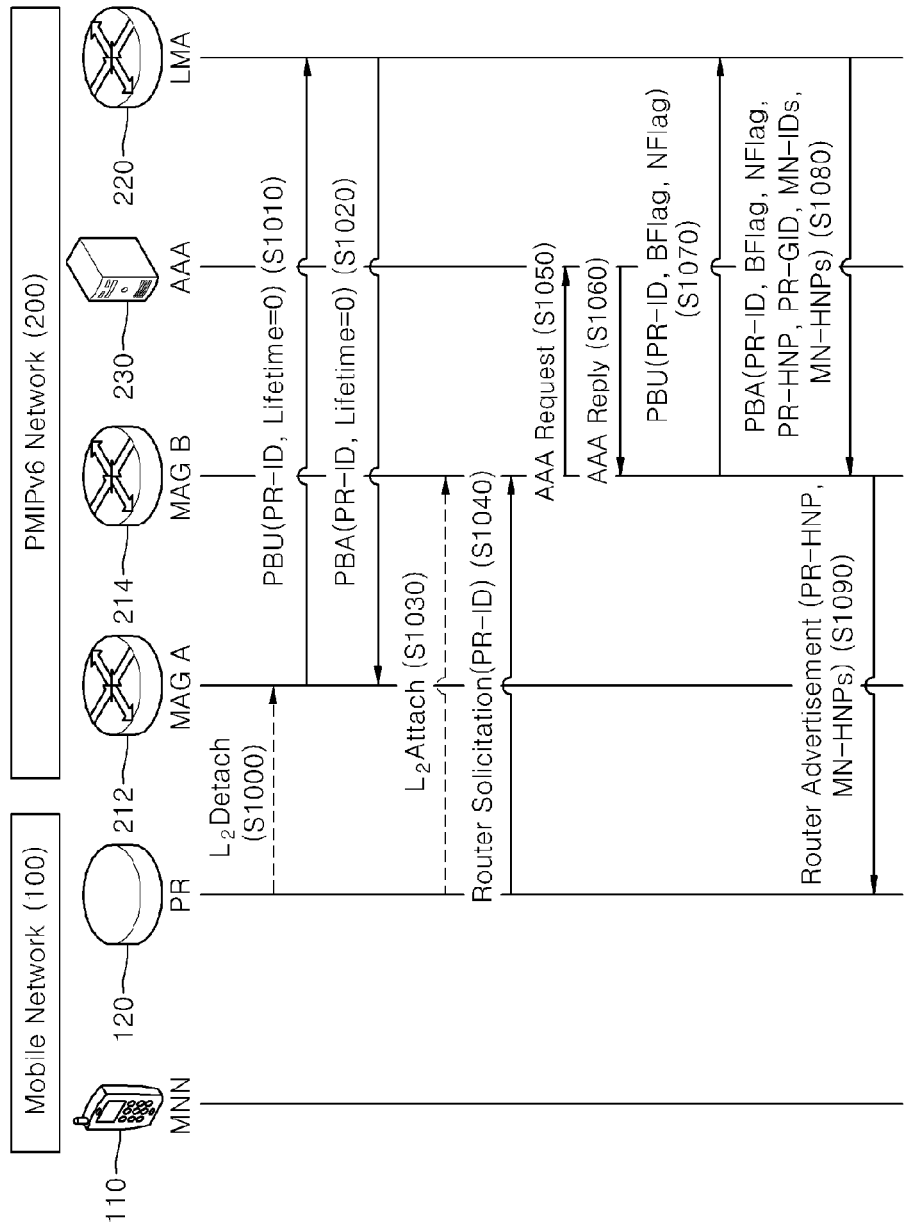
FIG. 10 is a flow diagram showing a procedure of a handover from a MAG A to a MAG B.

Next, a handover procedure to be managed by the proxy router 120 according to example embodiments of the present invention will be described. FIG. 10 is a flow diagram showing a procedure of a handover from the MAG-A 212 to the MAG-B 214. The handover process shown in FIG. 10 is performed in a state in which the mobile node 110 is connected to the PMIPv6 network 200 by the process shown in FIG. 5. The mobile node 110 does not participate in the handover procedure, and the handover process is performed by the proxy router 120 according to example embodiments of the present invention.

Referring to FIG. 10, first, the proxy router 120 detaches from the MAG-A 212 for the handover (S1000). When the detachment of the proxy router 120 is detected through a signal of an $L_2$ layer, the MAG-A 212 reports the detachment of the proxy router 120 by transmitting a PBU message in which the lifetime is set to '0' to the LMA 220 (S1010). At this time, the unique ID (PR-ID) of the proxy router 120 is included and transmitted in the PBU message. In response thereto, the LMA 220 transmits a PBA message in which the lifetime is set to '0' and the unique ID (PR-ID) of the proxy router 120 is included, to the MAG-A 212 (S1020).

Next, the proxy router 120 is attached to the MAG-B 214 (S1030), and a router solicitation message including the unique ID (PR-ID) of the proxy router 120 is transmitted to the MAG-B 214 (S1040). The MAG-B 214 transmits a message for requesting the authentication of the proxy router 120 to the authentication server 230 (S1050), and checks that the attached terminal is the proxy router 120 by receiving an authentication response from the authentication server 230 (S1060).

Thereafter, the MAG-B 214 transmits a PBU message in which the unique ID (PR-ID) of the proxy router 120 is included, and the status values of the 'B' and 'N' flags described above are set to '1', to the LMA 220 (S1070). The LMA 220 reflects the occurrence of the handover by changing information of a MAG connected to all terminals having the group ID (PR-GID) stored in the binding cache entry corresponding to the unique ID (PR-ID) of the proxy router 120, that is, all mobile nodes 110 belonging to the same group as the proxy router 120, from the MAG-A 212 to the MAG-B 214.

The LMA 220 includes IDs of all terminals belonging to a corresponding group, that is, the unique ID (PR-ID) of the proxy router 120 and the IDs (MN-ID) of the mobile nodes 110, and information of a home network prefix (PR-HNP) and a mobile home network prefix (MN-HNP) allocated to each terminal along with information of the group ID (PR-GID) stored in the binding cache entry, in a PBA message, and transmits the PBA message to the MAG-B 214 after setting the status values of the 'B' and 'N' flags to '1' (S1080).

The MAG-B 214 transmits a router advertisement message including the home network prefix (PR-HNP) allocated to the proxy router 120 and the mobile home network prefixes (MN-HNPs) allocated to the mobile nodes 110 belonging to the same group as the proxy router 120, to the proxy router 120 (S1090). Thereby, the procedure of the handover from the MAG-A 212 to the MAG-B 214 to be performed by the proxy router 120 according to example embodiments of the present invention is completed.

On the other hand, according to example embodiments of the present invention, the proxy router 120 may perform a handover procedure for a corresponding mobile node 110 when the mobile node 110 belonging to the same group is directly attached to the PMIPv6 network 200 by exiting the mobile network 100.

Figure 11:
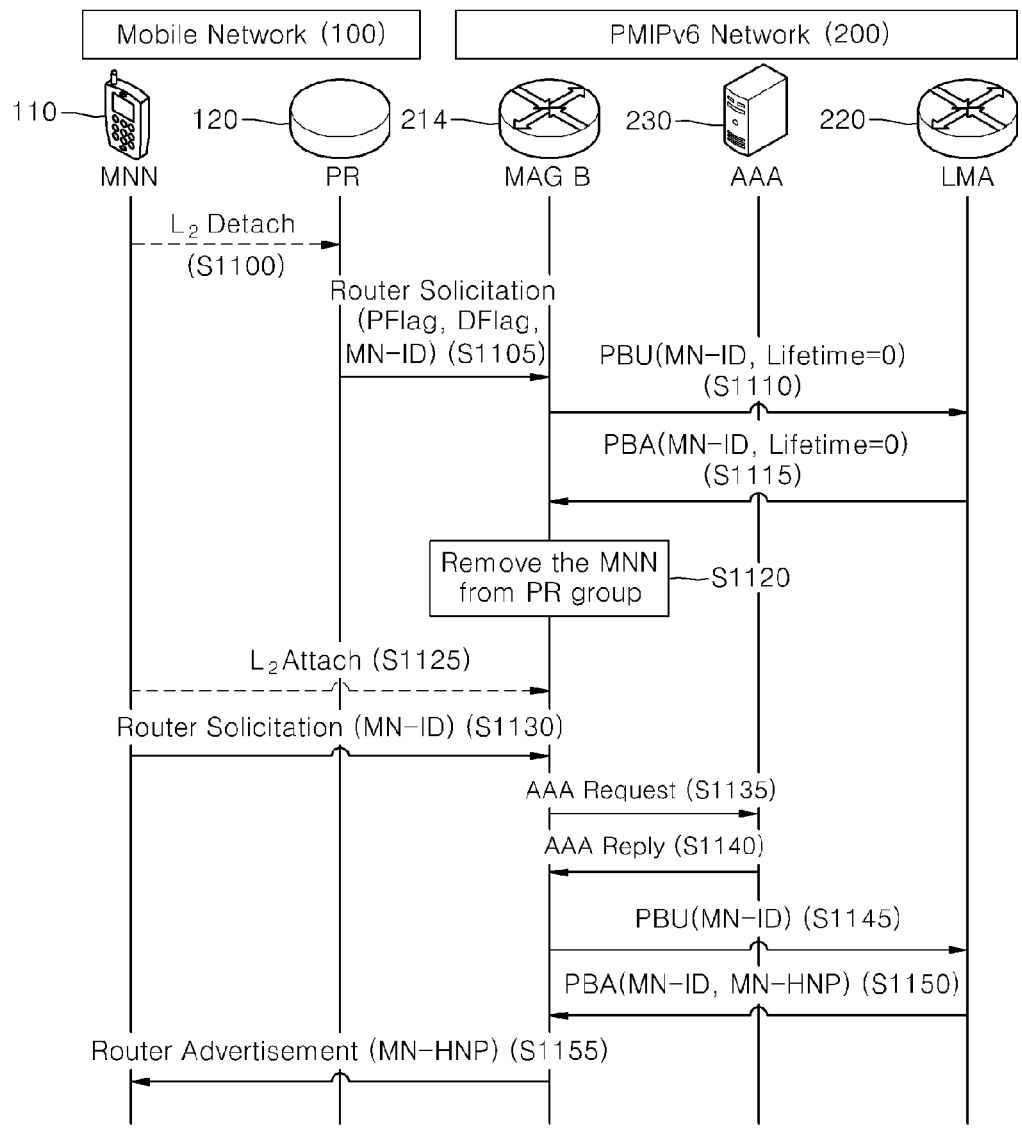
FIG. 11 is a flow diagram showing a process of performing a handover for a mobile node belonging to the same group as the proxy router according to example embodiments of the present invention.

FIG. 11 is a flow diagram showing a process of performing a handover for a mobile node 110 belonging to the same group as the proxy router 120. The handover process shown in FIG. 11 is performed in a state in which the proxy router 120 and mobile nodes 110 managed thereby are connected to the PMIPv6 network 200 through the MAG-B 214 by the handover process as shown in FIG. 10.

Referring to FIG. 11, after the mobile node 110 detaches from the proxy router 120 (S1100), the proxy router 120 detects the detachment and transmits a router solicitation message to the currently connected MAG-B 214 (S1105). At this time, the router solicitation message includes a unique ID (MN-ID) of the detached mobile node 110 and the status values of the 'P' flag and the 'D' flag described above are set to '1'. Here, if the status value of the 'D' flag is set to '1', it indicates the detachment of the mobile node 110. If the status value of the 'D' flag is set to '0', it indicates the attachment of the mobile node 110.

To perform a procedure for the detachment of the mobile node 110 through the status values of the 'P' and 'D' flags in the received router solicitation message, the MAG-B 214 transmits a PBU message to the LMA 220 (S1110). At this time, in the PBU message, a unique ID (MN-ID) is included and the lifetime is set to '0'. The status value of the 'B' flag of the PBU message is set to '0', thereby indicating leaving from a group in which the mobile node 110 is managed by the proxy router 120.

After receiving the PBA message in which the lifetime is set to '0' along with the unique ID (MN-ID) of the mobile node 110 from the LMA 220 (S1115), the MAG-B 214 reflects the fact that the mobile node 110 leaves the group managed by the proxy router 120 in the PBU list managed thereby (S1120).

After the mobile node 110 leaving the group is directly attached to the MAG-B 214 (S1125), the mobile node 110 may be attached to the PMIPv6 network 200 by transmitting a router solicitation message including its own unique ID (MN-ID) (S1130). A subsequent procedure follows a general PMIPv6 handover procedure.

Specifically, after receiving the router solicitation message from the mobile node 110, the MAG-B 214 sends an authentication request to the authentication server 230 and checks that a connected terminal is the mobile node 110 by receiving an authentication response from the authentication server 230 (S1140). Next, the MAG-B 214 transmits a PBU message including a unique ID (MN-ID) of the mobile node 110 to the LMA 220 (S1145). Upon receipt of a PBA message including a mobile home network prefix (MN-HNP) allocated to the mobile node 110 from the LMA 220 (S1150), the MAG-B 214 transmits it to the mobile node 110 in the form of a router advertisement message (S1155).

Figure 12:
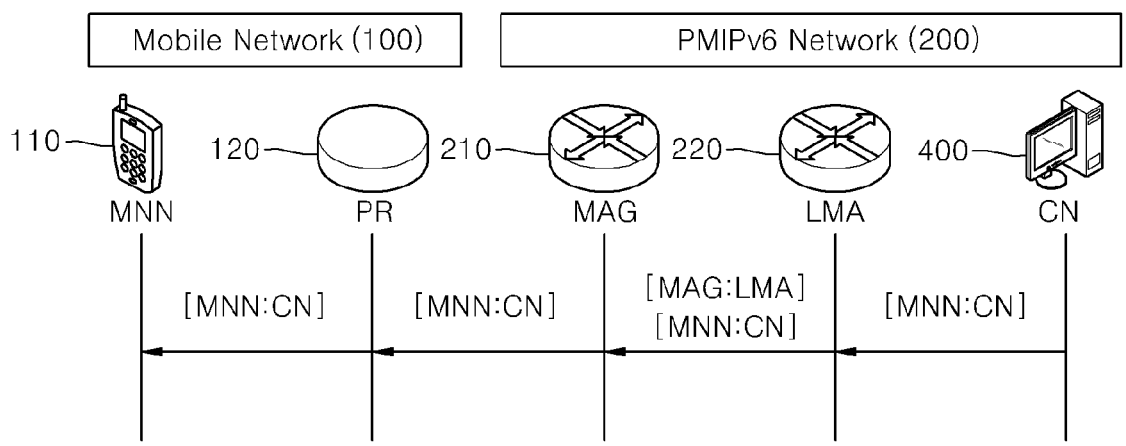
FIG. 12 is a diagram showing a process of delivering a data packet from a correspondent node belonging to an Internet network to a mobile node belonging to a mobile network.

FIG. 12 is a diagram showing a process of delivering a data packet from a correspondent node (CN) 400 belonging to the Internet network 300 to a mobile node 110 belonging to the mobile network 110.

Referring to FIG. 12, packet data created in the correspondent node 400 is delivered to an address of the mobile node 110. Addresses indicated in an IP header are indicated in the form of [Destination:Source], so that the packet data generated in the correspondent node is indicated in the form of [MNN:CN], where MNN is the address of the mobile node 110 and CN is an address of the correspondent node 400. The packet data transmitted from the correspondent node 400 is received by the LMA 220, and the packet data is transmitted to a MAG 210 by adding a tunnel header of [MAG:LMA] since the LMA 220 may know which MAG 210 is connected to the mobile node 110 through information stored in a binding cache entry. At this time, a PMIPv6 tunnel is used only in packet delivery between the LMA 220 and the MAG 210. In a subsequent transmission interval, packet data is delivered to the mobile node 110 without use of the tunnel header.

Since the MAG 210 receiving the packet data may know that the mobile node 110 currently belongs to the same group as the proxy router 120 through information stored in a PBU list, the packet data is directly transmitted to the proxy router 120 without an additional tunnel header by deleting the tunnel header indicated by [MAG:LMA]. The proxy router 120 delivers the packet data to the mobile node 110 without an additional tunnel header.

If packet data is delivered from the mobile node 110 to the correspondent node 400 in the opposite direction from the case shown in FIG. 12, a packet delivery process is performed in a state in which order of address information indicated in FIG. 12 is reversed.

The present invention may be realized as computer-readable codes in computer-readable recording media. The computer-readable recording media include all kinds of recording devices in which data that is readable by a computer system is being stored. Examples of the computer-readable recording media include ROM, RAM, CD-ROM, a magnetic tape, a floppy disk, an optical data storage device, etc., and may also be realized in the form of a carrier wave (for example, transmission through the Internet). In addition, the computer-readable recording media may be distributed into the computer system that is connected through the networks to store and implement the computer-readable codes in a distribution mechanism.

By the LMA, the proxy router, and the management method for supporting NEMO in the PMIPv6 network according to the example embodiments of the present invention, packet delivery cost due to an unnecessary tunnel may be reduced by grouping a plurality of mobile nodes constituting a mobile network, and using and managing flags and the same group ID. In addition, a handover for a plurality of mobile nodes may be easily performed using a group ID.

While the example embodiments of the present invention and their advantages have been described in detail, it should be understood that various changes, substitutions and alterations may be made herein without departing from the scope of the invention.

*** This research was supported by the MKE (The Ministry of Knowledge Economy), Korea, under the "program for CITG" support program supervised by the NIPA (National IT Industry Promotion Agency)"

What is claimed is:

1. A local mobility anchor (LMA) comprising:
a LMA that allocates mobile home network prefixes for address creation in a proxy mobile internet protocol version 6 (PMIPv6) network to mobile nodes forming one node group within the PMIPv6 network, and allocates a unique group identifier (GID) to a proxy router which delivers signal between the node group and the PMIPv6 network, wherein the GID is common to the proxy router and the mobile nodes forming one node group managed by the proxy router, and
wherein the proxy router delivers information regarding attachment of each of mobile nodes forming one node group within a mobile network and leaving from the node group, to a proxy mobile Internet protocol version 6 (PMIPv6) network.

2. The LMA of claim 1, wherein when the GID is allocated, a proxy binding acknowledgement (PBA) message to be transmitted to a mobile access gateway (MAG) of the PMIPv6 network includes a first flag related to the node group and a second flag for the proxy router, and status values of the first and second flags are set to a value indicating the allocation of the GID.

3. The LMA of claim 2, wherein when the mobile home network prefixes are allocated to the mobile nodes, the PBA message in which the GID is included and the status value of the first flag is set to the value indicating the allocation of the mobile home network prefix, is transmitted to the MAG.

4. The LMA of claim 1, wherein:
the GID and an identifier (ID) of a MAG of the PMIPv6 network connected to the proxy router are stored in a binding cache entry corresponding to IDs of the mobile nodes and the proxy router, a PBA message including the GID and the mobile home network prefixes allocated to the mobile nodes is transmitted to a second MAG when an attachment of the proxy router to the second MAG is made after a detachment of the proxy router from a first MAG of the PMIPv6 network is made, and an ID of the first MAG stored in the binding cache entry corresponding to the IDs of the mobile nodes and the proxy router is updated to an ID of the second MAG.

5. A proxy router for supporting network mobility (NEMO) in a mobile internet protocol network (MIPN) comprising:
a proxy router that receives a unique group identifier (GID) from a local mobility anchor (LMA),
wherein the proxy router delivers information regarding attachment of each of mobile nodes forming one node group within a mobile network and leaving from the node group, to a proxy mobile Internet protocol version 6 (PMIPv6) network, delivers mobile home network prefixes allocated by an local mobility anchor (LMA) of the PMIPv6 network to the mobile nodes, and delivers signal and data between the mobile nodes and the PMIPv6 network,
and wherein when the mobile node detaches from the proxy router, the proxy router detects the detachment of the mobile node and delivers the information regarding the mobile node leaving from the node group to the PMIPv6 network.

6. The proxy router of claim 5, wherein:
a router solicitation message to be delivered to a mobile access gateway (MAG) of the PMIPv6 network includes a first flag indicating a message related to a mobile node belonging to the node group, and the router solicitation message in which an identifier (ID) of the attached mobile node is included when the attachment of the mobile node belonging to the node group is detected, and a status value of a first flag is set to a value indicating the attachment of the mobile node is transmitted to the MAG.

7. The proxy router of claim 6, wherein:
the router solicitation message further includes a second flag indicating movement of the mobile node, and the router solicitation message in which the ID of the detached mobile node is included when the detachment of the mobile node belonging to the node group is detected, and status values of the first and second flags are set to a value indicating that the mobile node leaves the group, is transmitted to the MAG.

8. A management method for supporting network mobility (NEMO) by a local mobility anchor (LMA) of a proxy mobility internet protocol version 6 (PMIPv6) network, the method comprising:
allocating a unique group identifier (GID) to a proxy router, which delivers a signal between a node group including a plurality of mobile nodes within a mobile network and the PMIPv6 network; and
allocating mobile home network prefixes for address creation in the PMIPv6 network to the mobile nodes, wherein the GID is common to the proxy router and the mobile nodes included in the node group managed by the proxy router, and wherein the proxy router delivers information regarding attachment of each of mobile nodes forming one node group within a mobile network and leaving from the node group, to a proxy mobile Internet protocol version 6 (PMIPv6) network.

9. The management method of claim 8, wherein in allocating a GID to a proxy router, a proxy binding acknowledgement (PBA) message to be transmitted to a mobility access gateway (MAG) of the PMIPv6 network includes a first flag related to the node group and a second flag for the proxy router, and status values of the first and second flags are set to a value indicating the allocation of the GID.

10. The management method of claim 9, wherein in allocating mobile home network prefixes for address creation in the PMIPv6 network to the mobile nodes, the PBA message in which the GID is included and the status value of the first flag is set to the value indicating the allocation of the mobile home network prefix is transmitted to the MAG.

11. The management method of claim 8, further comprising:

storing the GID allocated to a proxy router by a LMA and an identifier (ID) of a mobility access gateway (MAG) of the PMIPv6 network connected to the proxy router in a binding cache entry corresponding to IDs of the mobile nodes and the proxy router, transmitting a proxy binding acknowledgement (PBA) message including the GID and the mobile home network prefixes allocated to the mobile nodes to a second mobility access gateway (MAG) when an attachment of the proxy router to the second MAG is made after a detachment of the proxy router from a first MAG of the PMIPv6 network is made, and updating an identifier (ID) of the first MAG stored in the binding cache entry corresponding to the IDs of the mobile nodes and the proxy router to an ID of the second MAG.

12. A non-transitory computer-readable recording medium recording a program for causing a computer to execute the management method of claim 8.

13. A management method for supporting network mobility (NEMO) by a proxy router, which delivers signal and data between mobile nodes forming one node group within a mobile network and a proxy mobility internet protocol version 6 (PMIPv6) network, the method comprising:

delivering information regarding an attachment of each of the mobile nodes and leaving from the node group, to the PMIPv6 network; and delivering mobile home network prefixes allocated by a local mobility anchor (LMA) of the PMIPv6 network to the mobile nodes, wherein the proxy router receives a unique group identifier (GID) from a local mobility anchor (LMA), and wherein when the mobile node detaches from the proxy router, the proxy router detects the detachment of the mobile node and delivers the information regarding the mobile node leaving from the node group to the PMIPv6 network.

14. The management method of claim 13, wherein:

a router solicitation message to be delivered to a mobility access gateway (MAG) of the PMIPv6 network includes a first flag indicating a message related to a mobile node belonging to the node group, and the router solicitation message in which an identifier (ID) of the attached mobile node is included when the attachment of the mobile node belonging to the node group is detected, and a status value of the first flag is set to a value indicating the attachment of the mobile node is transmitted to the MAG.

15. The management method of claim 14, wherein:

the router solicitation message further includes a second flag indicating movement of the mobile node, and the router solicitation message in which an ID of the detached mobile node is included when the detachment of the mobile node belonging to the node group is detected, and status values of the first and second flags are set to a value indicating that the mobile node leaves the group is transmitted to the MAG.

16. A non-transitory computer-readable recording medium recording a program for causing a computer to execute the management method of claim 13.

* * * * *